(12) United States Patent
Wang et al.

(10) Patent No.: US 10,099,690 B2
(45) Date of Patent: Oct. 16, 2018

(54) HYBRID ELECTRICAL VEHICLE AND METHOD FOR CRUISING CONTROL OF THE SAME

(71) Applicant: BYD COMPANY LIMITED, Shenzhen (CN)

(72) Inventors: Jinlong Wang, Shenzhen (CN); Hao Chen, Shenzhen (CN); Ou Ruan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 245 days.

(21) Appl. No.: 14/917,866

(22) PCT Filed: Sep. 5, 2014

(86) PCT No.: PCT/CN2014/086025
§ 371 (c)(1),
(2) Date: Mar. 9, 2016

(87) PCT Pub. No.: WO2015/032346
PCT Pub. Date: Mar. 12, 2015

(65) Prior Publication Data
US 2016/0221576 A1 Aug. 4, 2016

(30) Foreign Application Priority Data
Sep. 9, 2013 (CN) .......................... 2013 1 0409703

(51) Int. Cl.
*B60W 30/14* (2006.01)
*B60W 10/08* (2006.01)
(Continued)

(52) U.S. Cl.
CPC ............ *B60W 30/14* (2013.01); *B60W 10/06* (2013.01); *B60W 10/08* (2013.01); *B60W 20/10* (2013.01);
(Continued)

(58) Field of Classification Search
CPC combination set(s) only.
See application file for complete search history.

(56) References Cited

U.S. PATENT DOCUMENTS

| 5,927,415 A | 7/1999 | Ibaraki et al. |
| 6,059,059 A | 5/2000 | Schmidt-Brücken |

(Continued)

FOREIGN PATENT DOCUMENTS

| CN | 1447757 | 10/2003 |
| CN | 1528612 A | 9/2004 |

(Continued)

OTHER PUBLICATIONS

Notice of Allowance for U.S. Appl. No. 14/917,884 dated Oct. 12, 2017, 24 pages.

(Continued)

*Primary Examiner* — Thomas G Black
*Assistant Examiner* — Ana D Thomas
(74) *Attorney, Agent, or Firm* — Alston & Bird LLP (57) ABSTRACT

A hybrid electrical vehicle and a method for cruising control of the same are provided. The vehicle includes: a transmission device (1) connected with wheels (2a, 2b) of the hybrid electrical vehicle; an engine (3) and a gearbox (4), the engine (3) being connected with the transmission device (1) via the gearbox (4); an electric motor (5) and a gear reducer (6), the electric motor (5) being connected with the transmission device (1) via the gear reducer (6); a power battery (7) configured to supply power to the electric motor (5); and a control module configured to start the engine (3) and the electric motor (5) according to a working mode selected by a user from a plurality of working modes, and to control the vehicle to switch between the plurality of working modes according to a driving state of the vehicle and/or a working state of the power battery.

17 Claims, 5 Drawing Sheets

(51) Int. Cl.
  *B60W 10/06* (2006.01)
  *B60W 20/10* (2016.01)
  *B60W 20/40* (2016.01)
  *B60K 6/48* (2007.10)

(52) U.S. Cl.
  CPC .......... *B60W 20/40* (2013.01); *B60W 30/143* (2013.01); *B60K 6/48* (2013.01); *B60K 2006/4808* (2013.01); *B60W 2400/00* (2013.01); *B60W 2520/10* (2013.01); *B60W 2710/0666* (2013.01); *B60W 2710/0677* (2013.01); *B60W 2710/083* (2013.01); *B60W 2710/086* (2013.01); *B60W 2720/10* (2013.01); *Y02T 10/626* (2013.01); *Y02T 10/6221* (2013.01); *Y02T 10/6286* (2013.01); *Y10S 903/93* (2013.01)

(56) References Cited

U.S. PATENT DOCUMENTS

| | | | |
|---|---|---|---|
| 6,137,250 | A | 10/2000 | Hirano et al. |
| 6,177,773 | B1 | 1/2001 | Nakano et al. |
| 6,554,088 | B2 | 4/2003 | Severinsky et al. |
| 7,237,634 | B2 * | 7/2007 | Severinsky ............ B60H 1/004 180/65.23 |
| 7,647,994 | B1 * | 1/2010 | Belloso .................. B60K 6/448 180/65.25 |
| 8,018,190 | B2 | 9/2011 | Claeys et al. |
| 8,082,089 | B2 * | 12/2011 | Morgan ................ B60W 30/14 180/170 |
| 8,657,045 | B2 | 2/2014 | Wang et al. |
| 8,834,317 | B2 | 9/2014 | Wang et al. |
| 9,145,146 | B2 | 9/2015 | Bureau et al. |
| 2001/0039230 | A1 | 11/2001 | Severinsky et al. |
| 2002/0173391 | A1 | 11/2002 | Endo et al. |
| 2003/0217877 | A1 * | 11/2003 | Tatara .................... B60K 6/387 180/65.25 |
| 2004/0026141 | A1 | 2/2004 | Notsu et al. |
| 2004/0210356 | A1 | 10/2004 | Wilton et al. |
| 2005/0256631 | A1 | 11/2005 | Cawthorne |
| 2006/0021808 | A1 | 2/2006 | McGee et al. |
| 2006/0108956 | A1 | 5/2006 | Clark et al. |
| 2006/0231304 | A1 | 10/2006 | Severinsky et al. |
| 2007/0112496 | A1 | 5/2007 | Ji |
| 2007/0173372 | A1 | 7/2007 | Ueno |
| 2007/0293994 | A1 | 12/2007 | Zerbini et al. |
| 2008/0029319 | A1 | 2/2008 | Fleckner et al. |
| 2008/0091314 | A1 | 4/2008 | Hayashi et al. |
| 2008/0105477 | A1 | 5/2008 | Abe |
| 2008/0121443 | A1 | 5/2008 | Clark et al. |
| 2008/0146407 | A1 | 6/2008 | Tuckfield |
| 2008/0297073 | A1 | 12/2008 | Yatabe et al. |
| 2009/0306843 | A1 | 12/2009 | Jinno et al. |
| 2009/0321161 | A1 | 12/2009 | Tang |
| 2010/0030416 | A1 | 2/2010 | Jinno |
| 2010/0030447 | A1 | 2/2010 | Smyth et al. |
| 2010/0038159 | A1 | 2/2010 | Jinno et al. |
| 2010/0063661 | A1 | 3/2010 | Saito |
| 2010/0106355 | A1 | 4/2010 | Hattori et al. |
| 2010/0131217 | A1 | 5/2010 | Ichikawa |
| 2010/0145560 | A1 | 6/2010 | Komatsu et al. |
| 2010/0152938 | A1 | 6/2010 | Aoki et al. |
| 2010/0250041 | A1 | 9/2010 | Li |
| 2010/0300781 | A1 | 12/2010 | Leone |
| 2011/0071748 | A1 | 3/2011 | Nishigaki et al. |
| 2011/0082611 | A1 | 4/2011 | Shiba |
| 2011/0130906 | A1 | 6/2011 | Mayer |
| 2011/0130916 | A1 | 6/2011 | Mayer |
| 2011/0166733 | A1 | 7/2011 | Yu et al. |
| 2011/0172865 | A1 | 7/2011 | Liang et al. |
| 2011/0269599 | A1 | 11/2011 | Nakasako |
| 2011/0276209 | A1 | 11/2011 | Suganuma et al. |
| 2011/0288708 | A1 | 11/2011 | Katono et al. |
| 2011/0307130 | A1 | 12/2011 | Gow et al. |
| 2012/0072063 | A1 | 3/2012 | Kato et al. |
| 2012/0082536 | A1 | 4/2012 | Kawashima et al. |
| 2012/0083948 | A1 | 4/2012 | Tate, Jr. et al. |
| 2012/0323430 | A1 | 12/2012 | Nakamura et al. |
| 2013/0030634 | A1 | 1/2013 | Endo et al. |
| 2013/0060409 | A1 | 3/2013 | Matsushita et al. |
| 2013/0124026 | A1 | 5/2013 | Ueno et al. |
| 2013/0166122 | A1 | 6/2013 | Iino |
| 2013/0173107 | A1 | 7/2013 | Kokon |
| 2013/0245912 | A1 | 9/2013 | Boot |
| 2013/0249488 | A1 | 9/2013 | Ju et al. |
| 2013/0253743 | A1 | 9/2013 | Maruyama et al. |
| 2013/0304295 | A1 | 11/2013 | Tagawa et al. |
| 2014/0076085 | A1 | 3/2014 | Walters et al. |
| 2014/0077941 | A1 | 3/2014 | Yamamura et al. |
| 2014/0156132 | A1 | 6/2014 | Ichimoto |
| 2014/0163803 | A1 | 6/2014 | Kamatani et al. |
| 2014/0229043 | A1 | 8/2014 | Frank et al. |
| 2014/0244087 | A1 | 8/2014 | Jeong et al. |
| 2014/0274522 | A1 | 9/2014 | Davis et al. |
| 2014/0288757 | A1 | 9/2014 | Hirasawa et al. |
| 2015/0002053 | A1 | 1/2015 | Endo et al. |
| 2015/0039167 | A1 | 2/2015 | Ideshio et al. |
| 2015/0126329 | A1 | 5/2015 | Johri et al. |
| 2015/0134160 | A1 | 5/2015 | Liang et al. |
| 2015/0291149 | A1 | 10/2015 | Kitabatake et al. |
| 2015/0336558 | A1 | 11/2015 | Yamazaki |
| 2015/0367843 | A1 | 12/2015 | West et al. |
| 2016/0221570 | A1 | 8/2016 | Chen et al. |
| 2016/0221571 | A1 | 8/2016 | Chen et al. |
| 2016/0325728 | A1 | 11/2016 | Yang et al. |
| 2017/0036662 | A1 | 2/2017 | Chen et al. |
| 2017/0305406 | A1 * | 10/2017 | Dextreit ................ B60W 10/06 |

FOREIGN PATENT DOCUMENTS

| | | |
|---|---|---|
| CN | 1665697 | 9/2005 |
| CN | 1895942 | 1/2007 |
| CN | 1944139 | 4/2007 |
| CN | 101096180 | 1/2008 |
| CN | 101125548 | 2/2008 |
| CN | 101161523 A | 4/2008 |
| CN | 101186209 A | 5/2008 |
| CN | 101214797 | 7/2008 |
| CN | 101402314 A | 4/2009 |
| CN | 201214410 Y | 4/2009 |
| CN | 101445044 | 6/2009 |
| CN | 101445105 | 6/2009 |
| CN | 101587212 | 11/2009 |
| CN | 101618718 A | 1/2010 |
| CN | 101652538 A | 2/2010 |
| CN | 101674950 A | 3/2010 |
| CN | 101687507 A | 3/2010 |
| CN | 101830219 A | 9/2010 |
| CN | 101830222 A | 9/2010 |
| CN | 102009651 | 4/2011 |
| CN | 102009652 A | 4/2011 |
| CN | 102030005 A | 4/2011 |
| CN | 102126496 A | 7/2011 |
| CN | 102166963 A | 8/2011 |
| CN | 102180169 A | 9/2011 |
| CN | 102224047 A | 10/2011 |
| CN | 102267458 A | 12/2011 |
| CN | 102336148 A | 2/2012 |
| CN | 102358283 A | 2/2012 |
| CN | 102427980 A | 4/2012 |
| CN | 102490722 A | 6/2012 |
| CN | 102612448 A | 7/2012 |
| CN | 102658817 A | 9/2012 |
| CN | 102712313 A | 10/2012 |
| CN | 102745092 A | 10/2012 |
| CN | 102815295 | 12/2012 |
| CN | 102849064 A | 1/2013 |
| CN | 102849066 A | 1/2013 |
| CN | 103158695 A | 6/2013 |
| CN | 103189258 A | 7/2013 |
| CN | 103201153 A | 7/2013 |
| CN | 103249624 A | 8/2013 |
| CN | 103269926 A | 8/2013 |

(56) References Cited

FOREIGN PATENT DOCUMENTS

| | | | |
|---|---|---|---|
| DE | 102007016515 A1 | 10/2008 | |
| DE | 102009039615 | 3/2011 | |
| DE | 102010060681 | 5/2012 | |
| DE | 102011122307 | 6/2013 | |
| EP | 0 867 323 A2 | 9/1998 | |
| EP | 2133252 B1 * | 5/2003 | ............ B60W 20/00 |
| EP | 1 813 794 A1 | 8/2007 | |
| EP | 2 063 088 A1 | 5/2009 | |
| EP | 2 112 015 A1 | 10/2009 | |
| EP | 2 127 981 A1 | 12/2009 | |
| EP | 2 133 252 A1 | 12/2009 | |
| EP | 2 168 827 A1 | 3/2010 | |
| EP | 2 226 229 A1 | 9/2010 | |
| EP | 2 308 732 A1 | 4/2011 | |
| EP | 2 371 645 A1 | 10/2011 | |
| EP | 2 371 646 A1 | 10/2011 | |
| EP | 2 409 871 A2 | 1/2012 | |
| EP | 2 460 704 A1 | 6/2012 | |
| EP | 2 546 089 A2 | 1/2013 | |
| JP | 2006-050704 A | 2/2006 | |
| JP | 2006-094626 | 4/2006 | |
| JP | 2006-183547 A | 7/2006 | |
| JP | 2008-128192 | 6/2008 | |
| JP | 2008-168700 | 7/2008 | |
| JP | 2008271781 | 11/2008 | |
| JP | 2009-090735 | 4/2009 | |
| JP | 2009-166516 | 7/2009 | |
| JP | 2009-198223 | 9/2009 | |
| JP | 2010-179789 A | 8/2010 | |
| JP | 2010-241260 | 10/2010 | |
| JP | 2010-242575 A | 10/2010 | |
| JP | 2011-189814 A | 9/2011 | |
| JP | 2011-213166 | 10/2011 | |
| JP | 2012-086701 A | 5/2012 | |
| JP | 2012-091563 | 5/2012 | |
| JP | 2013-086704 | 5/2013 | |
| JP | WO 2013/072992 A1 | 4/2015 | |
| KR | 100887797 B1 | 3/2009 | |
| WO | WO 2008/108498 A1 | 9/2008 | |
| WO | WO 2009/008546 A1 | 1/2009 | |
| WO | WO-2010/143077 A2 | 12/2010 | |
| WO | WO 2012/059999 A1 | 5/2012 | |
| WO | WO-2012/123486 | 9/2012 | |
| WO | WO-2012/153395 | 11/2012 | |
| WO | WO-2013/084333 | 6/2013 | |
| WO | WO-2013/110706 A1 | 8/2013 | |

OTHER PUBLICATIONS

Office Action for U.S. Appl. No. 14/917,907 dated Oct. 20, 2017, 19 pages.
JPO machine translation of JP 2010-241260 (original JP document published Oct. 28, 2010).
EPO machine translation of DE 102010060681 (original DE document published May 24, 2012).
"Cruise Control—Wikipedia, the free encyclopedia." [retrieved May 8, 2017]. Retrieved via the Internet Archive Wayback Machine at <URL:https://web.archive.org/web/20130828091003/https://en.wikipedia.org/wiki/Cruise_control>. (dated Aug. 13, 2013). 8 pages.
Search Report for Chinese Patent Application No. 201310444535.3 dated Dec. 23, 2013, 5 pages.
Office Action from Chinese Patent Application No. 201310444535.3 dated Jun. 16, 2016, with English translation, 21 pages.
Extended European Search Report for European Patent Application No. 14842364.3 dated Apr. 11, 2017, 11 pages.
Extended European Search Report for European Patent Application No. 14842235.5 dated Apr. 20, 2017, 8 pages.
Extended European Search Report for European Patent Application No. 14842391.6 dated Apr. 20, 2017, 9 pages.
Extended European Search Report for European Patent Application No. 14842721.4 dated Apr. 20, 2017, 8 pages.
Extended European Search Report for European Patent Application No. 14843096.0 dated Apr. 20, 2017, 8 pages.
Extended European Search Report for European Patent Application No. 14841488.1 dated May 4, 2017, 9 pages.
Extended European Search Report for European Patent Application No. 14842854.3 dated May 11, 2017, 10 pages.
Office Action for U.S. Appl. No. 14/917,884 dated Apr. 3, 2017, 35 pages.
Office Action for U.S. Appl. No. 14/917,895 dated Apr. 7, 2017, 31 pages.
Office Action for U.S. Appl. No. 14/917,895 dated Sep. 5, 2017, 13 pages.
Office Action for U.S. Appl. No. 14/917,881 dated Jun. 26, 2017, 16 pages.
International Search Report and Written Opinion from International Application No. PCT/CN2014/085825 dated Nov. 13, 2014.
International Search Report and Written Opinion from International Application No. PCT/CN2014/085826 dated Nov. 15, 2014.
International Search Report and Written Opinion from International Application No. PCT/CN2014/085828 dated Dec. 1, 2014.
International Search Report and Written Opinion from International Application No. PCT/CN2014/085829 dated Dec. 3, 2014.
International Search Report and Written Opinion from International Application No. PCT/CN2014/085830 dated Nov. 19, 2014.
International Search Report and Written Opinion from International Application No. PCT/CN2014/086018 dated Dec. 17, 2014.
International Search Report and Written Opinion from International Application No. PCT/CN2014/086023 dated Dec. 12, 2014.
International Search Report and Written Opinion from International Application No. PCT/CN2014/086025 dated Dec. 10, 2014.
International Search Report and Written Opinion from International Application No. PCT/CN2014/086031 dated Dec. 3, 2014.
Office Action from Chinese Patent Application No. 201310405003.9 dated Dec. 11, 2013.
Office Action from Chinese Patent Application No. 201310444535.3 dated Dec. 11, 2013.
Office Action for U.S. Appl. No. 14/917,887 dated Nov. 16, 2017, 9 pages.
Office Action for U.S. Appl. No. 14/917,881 dated Dec. 8, 2017, 9 pages.
Corrected Notice of Allowability for U.S. Appl. No. 14/917,884 dated Nov. 14, 2017, 2 pages.
Corrected Notice of Allowability for U.S. Appl. No. 14/917,884 dated Jan. 2, 2018, 3 pages.
Office Action for U.S. Appl. No. 14/917,895 dated Jan. 8, 2018, 39 pages.

* cited by examiner

HYBRID ELECTRICAL VEHICLE AND METHOD FOR CRUISING CONTROL OF THE SAME

CROSS REFERENCE TO RELATED APPLICATION

This application claims priority to and benefits of Chinese Patent Application No. 201310409703.5, filed with State Intellectual Property Office on Sep. 9, 2013, the entire content of which is incorporated herein by reference.

FIELD

Embodiments of the present disclosure generally relate to a vehicle technology field, and more particularly, to a hybrid electrical vehicle and a method for cruising control of the hybrid electrical vehicle.

BACKGROUND

Nowadays, a hybrid electrical vehicle (HEV) includes two power sources, i.e. an engine and an electric motor, and travels by means of at least one of the power sources. Such a hybrid electrical vehicle has a cruising function, in other words, the hybrid electrical vehicle can be automatically traveled at a constant speed by means of the automatic cruising function, at the same time a driver does not need to operate an accelerator pedal of the hybrid electrical vehicle.

However, in a conventional method for cruising control of the hybrid electrical vehicle, when the driver sets a target speed of the hybrid electrical vehicle for driving in the constant-speed drive (cruising drive), even if an output power of the hybrid electrical vehicle can meet a driving requirement and an electric quantity of a battery is enough, an idle stop is relieved and the engine is started, which results in wasted fuel. In other words, in the conventional method for cruising control of the hybrid electrical vehicle, the hybrid electrical vehicle does not cruise in an electric vehicle (EV) mode, but only cruises in a HEV mode, which does not meet a cruising requirement of a user in different working modes and is inconvenient for the user to drive.

SUMMARY

Embodiments of the present disclosure seek to solve at least one of the problems existing in the related art to at least some extent.

An object of the present disclosure is to provide a method for cruising control of a hybrid electrical vehicle, which can realize a selection of driving modes and obtain a constant driving speed by means of an automatic cruising function, so as to meet different driving requirements of a driver, to facilitate the driving and to reduce fuel consumption at the same time.

Another object of the present disclosure is to provide the hybrid electrical vehicle.

In order to achieve above objects, embodiments of a first aspect of the present disclosure provide a method for cruising control of a hybrid electrical vehicle. The method includes: detecting a current speed of the hybrid electrical vehicle; determining whether the current speed of the hybrid electrical vehicle is in a predetermined cruise-speed range; and controlling the hybrid electrical vehicle to enter a corresponding cruising mode according to a cruising signal and a current working mode of the hybrid electrical vehicle, if the current speed of the hybrid electrical vehicle is in the predetermined cruise-speed range; wherein the hybrid electrical vehicle is controlled to enter a HEV cruising mode when the current working mode of the hybrid electrical vehicle is a HEV mode; the hybrid electrical vehicle is controlled to enter an EV cruising mode when the current working mode of the hybrid electrical vehicle is an EV mode; and the hybrid electrical vehicle is controlled to enter the HEV cruising mode and an engine of the hybrid electrical vehicle is controlled to start, when the hybrid electrical vehicle is in the EV cruising mode and a maximum output power of an electric motor of the hybrid electrical vehicle is less than a first power value or a maximum output torque of the electric motor of the hybrid electrical vehicle is less than a first torque value, in which the first power value is a first demanded power of the hybrid electrical vehicle cruising at the current speed, when the hybrid electrical vehicle is in the EV cruising mode; and the first torque value is a first demanded torque of the hybrid electrical vehicle cruising at the current speed, when the hybrid electrical vehicle is in the EV cruising mode.

With the method for cruising control of the hybrid electrical vehicle according to embodiments of the present disclosure, it is possible to realize a selection of driving modes and obtain a constant driving speed by means of an automatic cruising function, so as to meet different driving requirements of a driver, to facilitate the driving and to reduce fuel consumption at the same time, which is more economic and facilitates environmental protection.

In order to achieve the above objects, embodiments of a second aspect of the present disclosure provide a hybrid electrical vehicle. The hybrid electrical vehicle includes: a transmission device configured to drive wheels of the hybrid electrical vehicle; an engine and a gearbox, in which the engine is connected with the transmission device via the gearbox; an electric motor and a gear reducer, in which the electric motor is connected with the transmission device via the gear reducer; a power battery configured to supply power to the electric motor; a speed detector configured to detect a speed of the hybrid electrical vehicle; and a control module connected with the speed detector, the engine and the gearbox respectively, and configured to determine whether the current speed of the hybrid electrical vehicle is in a predetermined cruise-speed range, and to control the hybrid electrical vehicle to enter a corresponding cruising mode according to a cruising signal and a current working mode of the hybrid electrical vehicle, if the current speed of the hybrid electrical vehicle is in the predetermined cruise-speed range; wherein the control module controls the hybrid electrical vehicle to enter a HEV cruising mode when the current working mode of the hybrid electrical vehicle is a HEV mode; the control module controls the hybrid electrical vehicle to enter an EV cruising mode when the current working mode of the hybrid electrical vehicle is an EV mode; and the control module controls the hybrid electrical vehicle to enter the HEV cruising mode and controls the engine of the hybrid electrical vehicle to start, when the hybrid electrical vehicle is in the EV cruising mode and a maximum output power of an electric motor of the hybrid electrical vehicle is less than a first power value or a maximum output torque of the electric motor of the hybrid electrical vehicle is less than a first torque value, in which the first power value is a first demanded power of the hybrid electrical vehicle cruising at the current speed, when the hybrid electrical vehicle is in the EV cruising mode; and the first torque value is a first demanded torque of the hybrid electrical vehicle cruising at the current speed, when the hybrid electrical vehicle is in the EV cruising mode.

With the method according to embodiments of the present disclosure, it is possible to realize a selection of driving modes and obtain a constant driving speed by means of an automatic cruising function, so as to meet different driving requirements of a driver, to facilitate the driving and to reduce fuel consumption at the same time, which is more economic and facilitates environmental protection. In addition, the engine and the electric motor are connected in parallel, which can effectively improve an energy utilization factor as compared with a series connection structure adopted in a power system of the conventional hybrid electrical vehicle. Moreover, the parallel connection is simple in structure and can avoid a complex ECVT match in a series-parallel connection, which reduces a risk of driving non-comfort caused by the match failure, and thus the economy of the hybrid electrical vehicle is greatly improved on the premise of ensuring the power performance of the hybrid electrical vehicle.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The following description provides a plurality of embodiments or examples configured to achieve different structures of the present disclosure. In order to simplify the publication of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present disclosure, unless specified or limited otherwise, it should be noted that, terms "mounted," "connected" and "coupled" may be understood broadly, such as electronic connection or mechanical connection, inner communication between two elements, direct connection or indirect connection via intermediary. These having ordinary skills in the art should understand the specific meanings in the present disclosure according to specific situations.

With reference to the following descriptions and drawings, these and other aspects of embodiments of the present disclosure will be distinct. In the descriptions and drawings, some particular embodiments are described in order to show means of the principles of embodiments according to the present disclosure, however, it should be appreciated that the scope of embodiments according to the present disclosure is not limited. On the contrary, embodiments of the present disclosure include all the changes, alternatives, and modifications falling into the scope of the spirit and principles of the attached claims.

In the following, a hybrid electrical vehicle and a method for cruising control of a hybrid electrical vehicle are described in detail with reference to drawings.

Figure 1:
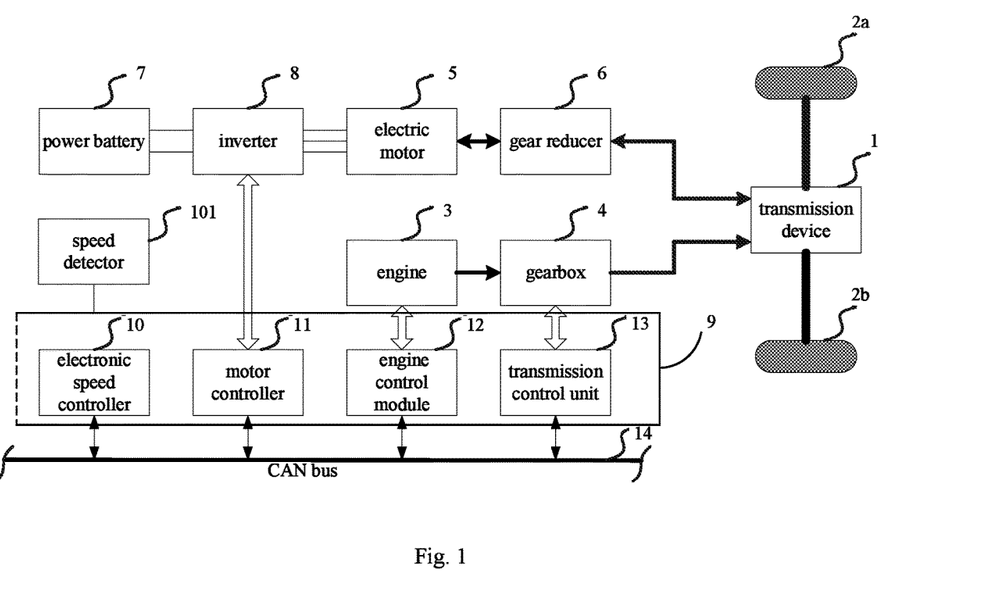
FIG. 1 is a schematic diagram of a hybrid electrical vehicle according to an embodiment of the present disclosure.

FIG. 1 is a schematic diagram of a hybrid electrical vehicle according to an embodiment of the present disclosure. As shown in FIG. 1, the hybrid electrical vehicle includes a transmission device 1, wheels 2a and 2b, an engine 3, a gearbox 4, an electric motor 5, a gear reducer 6, a power battery 7, an inverter 8, a control module 9 and a speed detector 101.

The transmission device 1 is configured to drive the wheels 2a and 2b of the hybrid electrical vehicle, the engine 3 is connected with the transmission device 1 via the gearbox 4, the electric motor 5 is connected with the transmission device 1 via the gear reducer 6, the power battery 7 is configured to provide power to the electric motor 5, and the speed detector 101 is configured to detect the current speed of the hybrid electrical vehicle. When the current speed of the hybrid electrical vehicle is in a predetermined cruise-speed range, the control module 9 controls the hybrid electrical vehicle to enter a corresponding cruising mode according to a cruising signal from a user and a current working mode of the hybrid electrical vehicle.

As shown in FIG. 1, the engine 3 is an efficient turbocharged direct injection engine capable of outputting power for driving the hybrid electrical vehicle, and the gearbox 4 is a double clutch gearbox capable of transmitting the power output from the engine 3, and the power battery 7 is connected with the inverter 8 via a DC (direct current) bus, and the inverter 8 is connected with the electric motor 5 via an AC (alternating current) three-phase wire, and then electric power and fuel power are coupled at the transmission device 1 and transmitted to the wheels 2a and 2b. The control module 9 includes an electronic speed controller 10, a motor controller 11, an engine control module 12 and a transmission control unit 13. The electronic speed controller 10 is configured to calculate the speed of the hybrid electrical vehicle and to send the speed of the hybrid electrical vehicle to a CAN bus 14. The motor controller 11 is configured to realize a power control/electric control on the electric motor 5, to sample a cruising control signal, an accelerator pedal depth signal etc. via a hard line, to receive the speed of the hybrid electrical vehicle from the CAN bus 14, and to execute a power system control scheme according to the above signals, and then to send a target output torque signal and a start-stop signal of the engine to the engine control module 12 via the CAN bus 14. The engine control module 12 is configured to control the engine 3, to execute a power system control scheme, and to send an actual output torque value to the motor controller 11. The transmission control unit 13 is configured to control the gearbox 4, to sample the accelerator pedal depth signal and the speed signal etc., and to change a gear according to a transmission shift strategy.

In an embodiment of the present disclosure, when the current speed of the hybrid electrical vehicle is larger than or equal to a first predetermined speed threshold and less than or equal to a second predetermined speed threshold, the control module 9 determines that the current speed of the hybrid electrical vehicle is in the predetermined cruise-speed range, in which the first predetermined speed threshold is less than the second predetermined speed threshold.

In an embodiment of the present disclosure, a working mode of the hybrid electrical vehicle includes a HEV mode and an EV mode. The control module 9 controls the hybrid electrical vehicle to enter a HEV cruising mode when the current working mode of the hybrid electrical vehicle is the HEV mode. The control module 9 controls the hybrid electrical vehicle to enter an EV cruising mode when the current working mode of the hybrid electrical vehicle is the EV mode.

In other words, entering the cruising control mode and the cruising strategy selection in the two working modes are determined according to the cruising signal, the current speed and the working mode of the hybrid electrical vehicle. If the cruising signal is detected and the current speed of the hybrid electrical vehicle is in the predetermined cruise-speed range, the hybrid electrical vehicle enters the cruising mode, otherwise, the hybrid electrical vehicle does not enter the cruising mode. After the hybrid electrical vehicle enters the cruising mode, if the current working mode of the hybrid electrical vehicle is the EV mode, the control module 9 controls the hybrid electrical vehicle to enter the EV cruising mode; if the current working mode of the hybrid electrical vehicle is the HEV mode, the control module 9 controls the hybrid electrical vehicle to enter the HEV cruising mode.

In an embodiment of the present disclosure, when the hybrid electrical vehicle is in the EV cruising mode, if the control module 9 determines that a maximum output power of the electric motor 5 is larger than or equal to a first power value and a maximum output torque of the electric motor 5 is larger than or equal to a first torque value, the control module 9 controls the electric motor 5 to output a first output torque according to a first demanded torque of the hybrid electrical vehicle cruising at the current speed. Moreover, if the maximum output power of the electric motor 5 of the hybrid electrical vehicle is less than the first power value or the maximum output torque of the electric motor 5 of the hybrid electrical vehicle is less than the first torque value, the control module 9 controls the engine of the hybrid electrical vehicle to start and controls the hybrid electrical vehicle to enter the HEV cruising mode. The first power value is a first demanded power of the hybrid electrical vehicle cruising at the current speed, when the hybrid electrical vehicle is in the EV cruising mode; the first torque value is the first demanded torque of the hybrid electrical vehicle cruising at the current speed, when the hybrid electrical vehicle is in the EV cruising mode.

In other words, during the cruising control in the EV cruising mode, it is necessary to compare the output power and the output torque of the electric motor with the demanded power and the demanded torque of the hybrid electrical vehicle cruising. When the output power and the output torque of the electric motor can meet the demanded power and the demanded torque of the hybrid electrical vehicle cruising at the current speed, only the electric motor 5 provides the power to the hybrid electrical vehicle in the EV cruising mode. When the output power and the output torque of the electric motor cannot meet the demanded power and the demanded torque of the hybrid electrical vehicle cruising at the current speed, the engine 3 is controlled to start and the hybrid electrical enters the HEV cruising mode.

In an embodiment of the present disclosure, when the hybrid electrical vehicle is in the HEV cruising mode, if the control module 9 determines that a sum of the maximum output power of the electric motor and a maximum output power of the engine 3 is larger than or equal to a second power value (i.e. a second demanded power of the hybrid electrical vehicle cruising at the current speed when the hybrid electrical vehicle is in the HEV cruising mode), when the sum of the maximum output torque of the electric motor 5 and a maximum output torque of the engine 3 is larger than or equal to a second torque value (i.e. a second demanded torque of the hybrid electrical vehicle cruising at the current speed when the hybrid electrical vehicle is in the HEV cruising mode) and the maximum output torque of the engine 3 is less than or equal to the second torque value, the control module 9 controls the engine 3 to output the maximum output torque and the electric motor 5 to output a second output torque, so that a sum of the maximum output torque of the engine 3 and the second output torque of the electric motor 5 is equal to the second torque value; when the maximum output torque of the engine 3 is larger than the second torque value, the control module 9 controls the engine 3 to output a third output torque according to the second demanded torque of the hybrid electrical vehicle cruising at the current speed. Moreover, when the sum of the maximum output power of the electric motor and the maximum output power of the engine is less than the second power value or the sum of the maximum output torque of the electric motor and the maximum output torque of the engine is less than the second torque value, the control module 9 controls the hybrid electrical vehicle to quit the HEV cruising mode.

In other words, during the cruising control in the HEV cruising mode, it is necessary to compare the output power and the output torque of the engine 3 and the output power and the output torque of the electric motor 5 with the demanded power and the demanded torque of the hybrid electrical vehicle cruising, in which the cruising output in the HEV cruising mode includes the engine output as a main output and the electric motor output as a supplementary output. If the sum of the maximum output power of the electric motor 5 and the maximum output power of the engine 3 cannot meet the demanded power of the hybrid electrical vehicle cruising at the current speed, the control module 9 controls the hybrid electrical vehicle to quit the HEV cruising mode. If the maximum output torque of the engine 3 can meet the demanded torque of the hybrid electrical vehicle cruising at the current speed, only the engine 3 outputs the power according to the demanded torque of the hybrid electrical vehicle cruising at the current speed. If the maximum output torque of the engine 3 cannot meet the demanded torque of the hybrid electrical vehicle cruising at the current speed, but the sum of the maximum output torque of the engine 3 and the maximum output torque of the electric motor 5 can meet the demanded torque of the hybrid electrical vehicle cruising at the current speed, the engine 3 outputs the maximum output torque thereof and the electric motor 5 outputs the rest torque.

In an embodiment of the present disclosure, when the hybrid electrical vehicle is cruising, if the control module 9 determines that the hybrid electrical vehicle is accelerating or decelerating, the control module 9 obtains a target speed of the hybrid electrical vehicle. When the target speed of the hybrid electrical vehicle is less than the first predetermined speed threshold Vmin, the control module 9 controls the hybrid electrical vehicle to cruise at the first predetermined speed threshold Vmin. When the target speed of the hybrid electrical vehicle is larger than or equal to the first predetermined speed threshold Vmin and less than or equal to the second predetermined speed threshold Vmax, in which the first predetermined speed threshold Vmin is less than the second predetermined speed threshold Vmax, the control module 9 controls the hybrid electrical vehicle to cruise at the target speed of the hybrid electrical vehicle. When the target speed of the hybrid electrical vehicle is larger than the second predetermined speed threshold Vmax, the control module 9 controls the hybrid electrical vehicle to cruise at the second predetermined speed threshold Vmax.

In other words, when an acceleration and deceleration setting signal of a cruise speed is detected, the control module 9 calculates the target speed of the hybrid electrical vehicle and then compares the target speed of the hybrid electrical vehicle with a lower limit of the cruise-speed (i.e. the first predetermined speed threshold Vmin) and an upper limit of the cruise-speed (i.e. the second predetermined speed threshold Vmax). If the target speed of the hybrid electrical vehicle is larger than or equal to the lower limit of the cruise-speed and less than or equal to the upper limit of the cruise-speed, the hybrid electrical vehicle is controlled to cruise at the target speed of the hybrid electrical vehicle. If the target speed of the hybrid electrical vehicle is less than the first predetermined speed threshold Vmin, the hybrid electrical vehicle is controlled to cruise at the first predetermined speed threshold Vmin. If the target speed of the hybrid electrical vehicle is larger than the second predetermined speed threshold Vmax, the hybrid electrical vehicle is controlled to cruise at the second predetermined speed threshold Vmax. During the cruising process, if the acceleration and deceleration setting signal of the cruise speed is not detected, the hybrid electrical vehicle is controlled to cruise at the current speed.

With the hybrid electrical vehicle according to embodiments of the present disclosure, it is possible to realize a selection of driving modes and obtain a constant driving speed by means of an automatic cruising function, so as to meet different driving requirements of a driver, to facilitate the driving and to reduce fuel consumption at the same time, which is more economic and facilitates environmental protection. In addition, the engine and the electric motor are connected in parallel, which can effectively improve an energy utilization factor as compared with a series connection structure adopted in a power system of the conventional hybrid electrical vehicle. Moreover, the parallel connection is simple in structure and can avoid a complex ECVT match in a series-parallel connection, which reduces a risk of driving non-comfort caused by the match failure, and thus the economy of the hybrid electrical vehicle is greatly improved on the premise of ensuring the power performance of the hybrid electrical vehicle.

Figure 2:
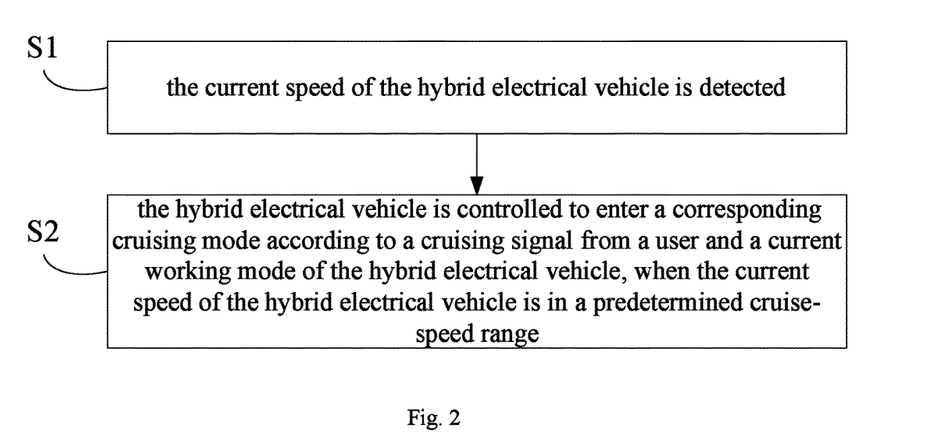
FIG. 2 is a flow chart of a method for cruising control of a hybrid electrical vehicle according to an embodiment of the present disclosure.

FIG. 2 is a flow chart of a method for cruising control of a hybrid electrical vehicle according to an embodiment of the present disclosure. As shown in FIG. 2, the method for cruising control of the hybrid electrical vehicle includes following steps.

At step S1, a current speed of the hybrid electrical vehicle is detected.

At step S2, the hybrid electrical vehicle is controlled to enter a corresponding cruising mode according to a cruising signal from a user and a current working mode of the hybrid electrical vehicle, when the current speed of the hybrid electrical vehicle is in a predetermined cruise-speed range.

Specifically, the working mode of the hybrid electrical vehicle includes a HEV mode and an EV mode. When the current working mode of the hybrid electrical vehicle is the HEV mode, the hybrid electrical vehicle is controlled to enter the HEV cruising mode. When the current working mode of the hybrid electrical vehicle is the EV mode, the hybrid electrical vehicle is controlled to enter the EV cruising mode.

Figure 3:
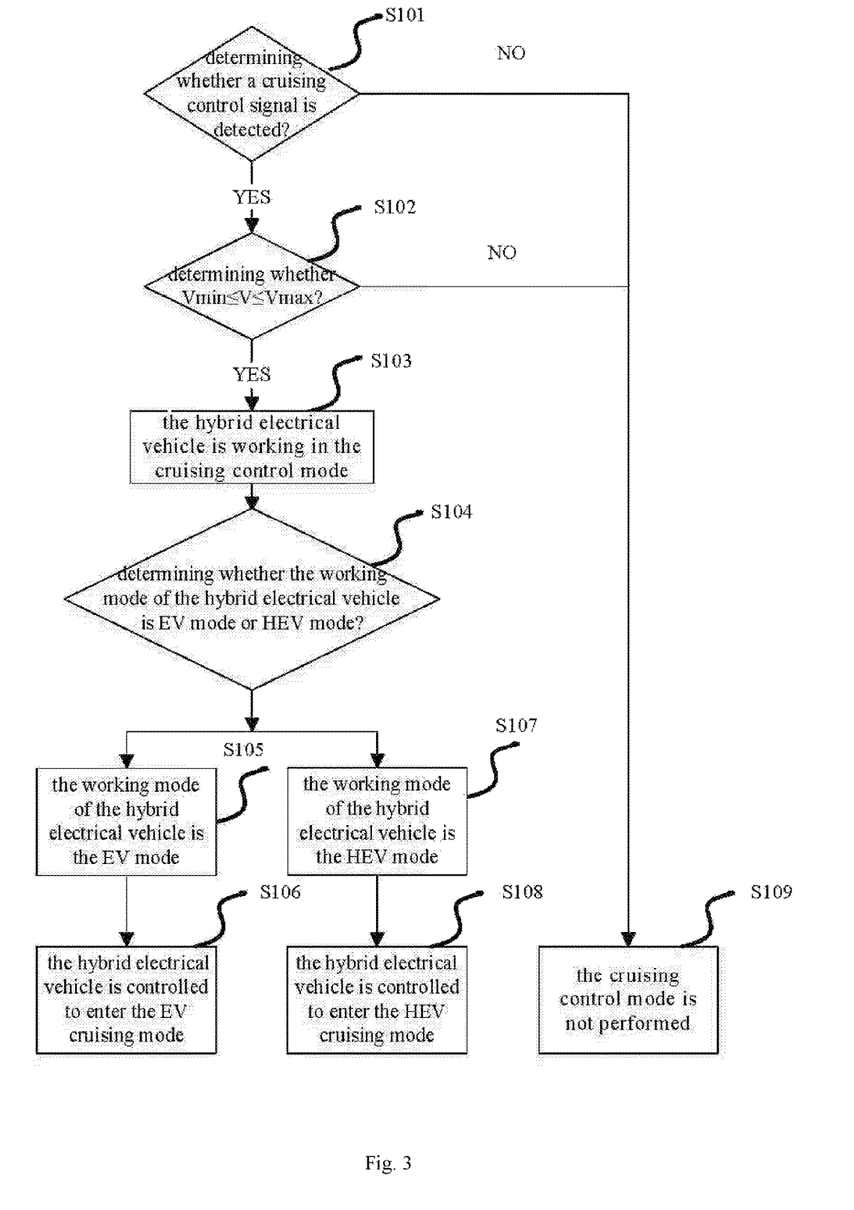
FIG. 3 is a flow chart of a method for cruising control of a hybrid electrical vehicle according to an embodiment of the present disclosure.

In an embodiment of the present disclosure, as shown in FIG. 3, a method for cruising control of the hybrid electrical vehicle includes following steps.

At step S101, the motor controller determines whether a cruising control signal is detected, if yes, step S102 is executed; and if no, step S109 is executed.

At step S102, the current speed V is compared with a lower limit of the cruise-speed (i.e. a first predetermined speed threshold Vmin) and an upper limit of the cruise-speed (i.e. a second predetermined speed threshold Vmax) to determine whether the current speed V is in the predetermined cruise-speed range [Vmin, Vmax], if yes, step S103 is executed; and if no, step S109 is executed.

At step S103, when the current speed V is in the predetermined cruise-speed range [Vmin, Vmax], the hybrid electrical vehicle is working in the cruising control mode.

At step S104, it is determined whether the working mode of the hybrid electrical vehicle is the EV mode or the HEV mode.

At step S105, when the working mode of the hybrid electrical vehicle is the EV mode, step S106 is executed.

At step S106, the hybrid electrical vehicle is controlled according to the cruising strategy of the EV mode, i.e. the hybrid electrical vehicle is controlled to enter the EV cruising mode.

At step S107, when the working mode of the hybrid electrical vehicle is the HEV mode, step S108 is executed.

At step S108, the hybrid electrical vehicle is controlled according to the cruising strategy of the HEV mode, i.e. the hybrid electrical vehicle is controlled to enter the HEV cruising mode.

At step S109, when the motor controller determines that the cruising control signal is not detected or the current speed V is not in the predetermined cruise-speed range [Vmin, Vmax], the cruising control mode is not performed.

In the above embodiment of the present disclosure, the cruise-speed range is limited, i.e. the hybrid electrical vehicle cruises in the [Vmin, Vmax] speed range. In addition, the cruising strategy of the EV mode and the cruising strategy of the HEV mode are provided for the different working modes, which can meet the cruising requirements of the user in the different working modes of the hybrid electrical vehicle.

Figure 4:
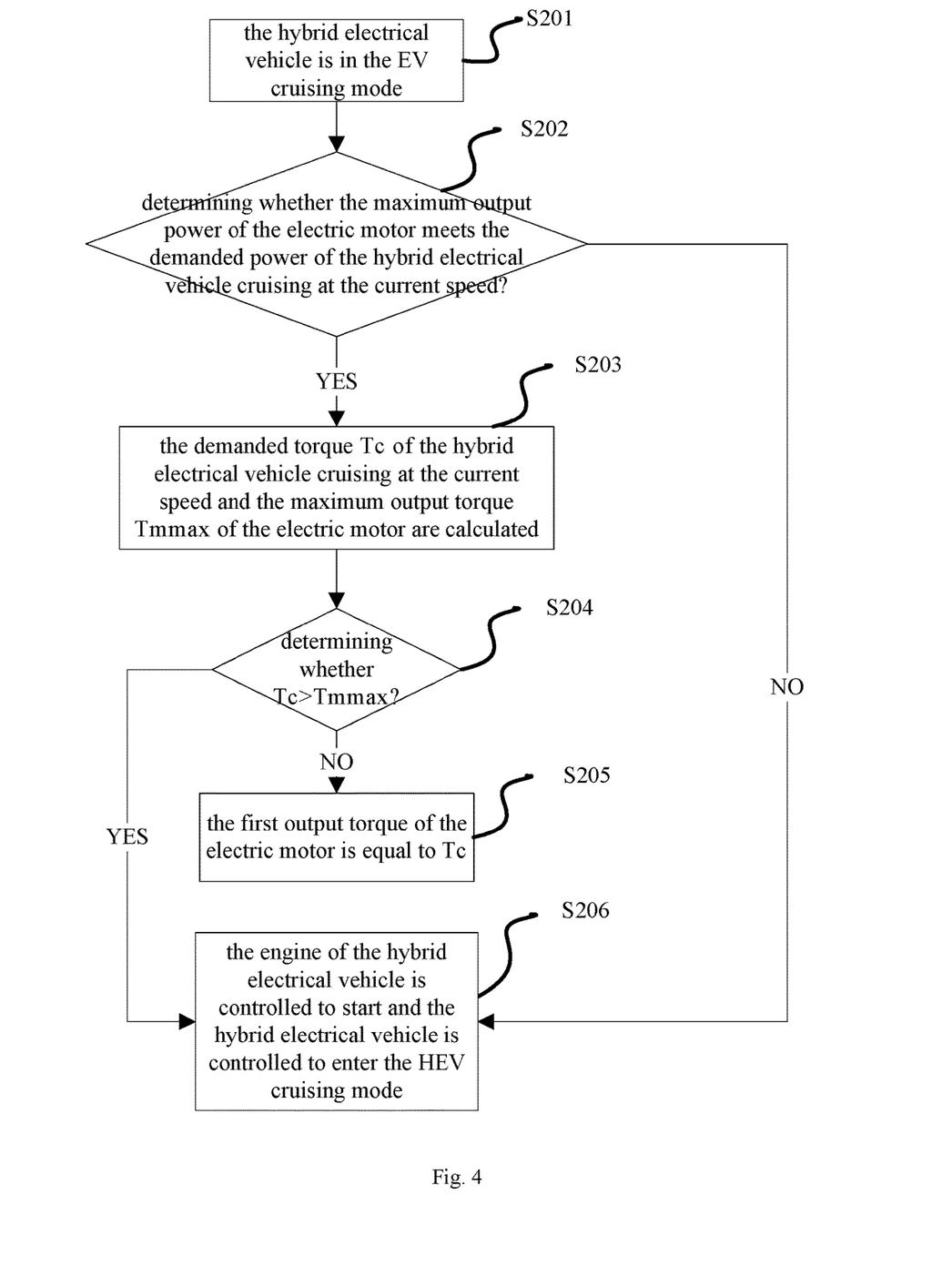
FIG. 4 is a flow chart of a method for cruising control of a hybrid electrical vehicle when the hybrid electrical vehicle is in an EV cruising mode according to an embodiment of the present disclosure.

In an embodiment of the present disclosure, as shown in FIG. 4, a method for cruising control of the hybrid electrical vehicle when the hybrid electrical vehicle is the EV cruising mode includes following steps.

At step S201, the hybrid electrical vehicle is in the EV cruising mode.

At step S202, it is determined whether the maximum output power of the electric motor meets the demanded power of the hybrid electrical vehicle cruising at the current speed, i.e. whether maximum output power of the electric motor is larger than or equal to the first power value, if yes, step S203 is executed; and if no, step S206 is executed.

At step S203, when the maximum output power of the electric motor can meet the demanded power of the hybrid electrical vehicle cruising at the current speed, the demanded torque Tc of the hybrid electrical vehicle cruising at the current speed and the maximum output torque Tmmax of the electric motor are calculated.

At step S204, the demanded torque Tc of the hybrid electrical vehicle cruising at the current speed is compared with the maximum output torque Tmmax of the electric motor to determine whether the demanded torque Tc is larger than the maximum output torque Tmmax, if yes, step S206 is executed; and if no, step S205 is executed.

At step S205, the motor controller controls the first output torque of the electric motor to be equal to Tc. In other words, when the hybrid electrical vehicle is in the EV cruising mode, if the control module determines that the maximum output power of the electric motor is larger than or equal to the first power value and the maximum output torque of the electric motor is larger than or equal to the first torque value, the control module controls the electric motor to output the first output torque according to the first demanded torque of the hybrid electrical vehicle cruising at the current speed. The first power value is the first demanded power of the hybrid electrical vehicle cruising at the current speed, when the hybrid electrical vehicle is in the EV cruising mode; the first torque value is the first demanded torque of the hybrid electrical vehicle cruising at the current speed, when the hybrid electrical vehicle is in the EV cruising mode.

At step S206, the engine of the hybrid electrical vehicle is controlled to start and the hybrid electrical vehicle is controlled to enter the HEV cruising mode.

In other words, when the maximum output power of the electric motor is less than the first power value or the maximum output torque of the electric motor is less than the first torque value, the engine of the hybrid electrical vehicle is controlled to start and the hybrid electrical vehicle is controlled to enter the HEV cruising mode.

In other words, during the cruising control in the EV cruising mode, it is necessary to compare the output power and the output torque of the electric motor with the demanded power and the demanded torque of the hybrid electrical vehicle cruising. When the output power and the output torque of the electric motor can meet the demanded power and the demanded torque of the hybrid electrical vehicle cruising at the current speed, the hybrid electrical vehicle is driven by means of the electric motor as the only power source, i.e. only the electric motor provides the power to the hybrid electrical vehicle in the EV cruising mode, which can meet the EV driving demand of the user. When the output power and the output torque of the electric motor cannot meet the demanded power and the demanded torque of the hybrid electrical vehicle cruising at the current speed, the electric motor cannot maintain the current cruising speed, and the engine is controlled to start and the hybrid electrical vehicle enters the HEV cruising mode, which can ensure the ability to continue the hybrid electrical vehicle to cruise.

Figure 5:
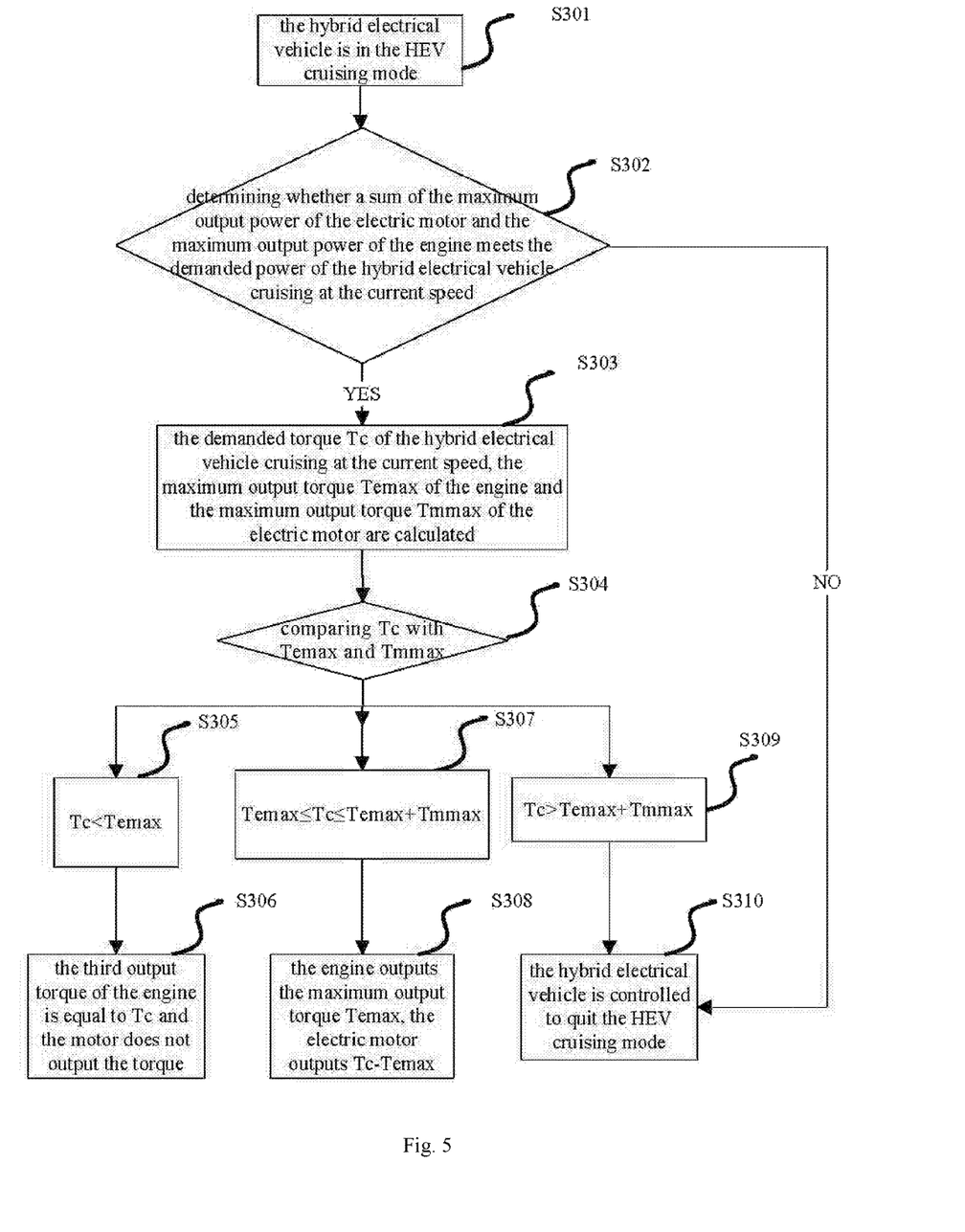
FIG. 5 is a flow chart of a method for cruising control of a hybrid electrical vehicle when the hybrid electrical vehicle is in a HEV cruising mode according to an embodiment of the present disclosure.

In another embodiment of the present disclosure, as shown in FIG. 5, a method for cruising control of the hybrid electrical vehicle when the hybrid electrical vehicle is the HEV cruising mode includes following steps.

At step S301, the hybrid electrical vehicle is in the HEV cruising mode.

At step S302, it is determined whether a sum of the maximum output power of the electric motor and the maximum output power of the engine meets the second demanded power of the hybrid electrical vehicle cruising at the current speed when the hybrid electrical vehicle is in the HEV cruising mode (i.e. the second power value), if yes, step S303 is executed; and if no, step S310 is executed.

At step S303, when the sum of the maximum output power of the electric motor and the maximum output power of the engine can meet the second demanded power of the hybrid electrical vehicle cruising at the current speed, the demanded torque Tc of the hybrid electrical vehicle cruising at the current speed, the maximum output torque Temax of the engine and the maximum output torque Tmmax of the electric motor are calculated.

At step S304, the demanded torque Tc of the hybrid electrical vehicle cruising at the current speed is compared with the maximum output torque Temax of the engine and the maximum output torque Tmmax of the electric motor to determine the relationship of the demanded torque Tc, the maximum output torque Temax of the engine and the maximum output torque Tmmax of the electric motor.

At step S305, when it is determined that Tc<Temax, step S306 is executed.

At step S306, the third output torque of the engine is equal to Tc and the motor does not output the torque. That is, when the hybrid electrical vehicle is in the HEV cruising mode, if it is determined that the sum of the maximum output power of the electric motor and the maximum output power of the engine is larger than or equal to the second power value (i.e. the second demanded power of the hybrid electrical vehicle cruising at the current speed when the hybrid electrical vehicle is in the HEV cruising mode), when the maximum output torque of the engine is larger than the second torque value (i.e. the second demanded torque Tc of the hybrid electrical vehicle cruising at the current speed when the hybrid electrical vehicle is in the HEV cruising mode), the engine is controlled to output the third output torque according to the second demanded torque Tc of the hybrid electrical vehicle cruising at the current speed.

At step S307, when it is determined that Temax≤Tc≤Temax+Tmmax, step S308 is executed.

At step S308, the engine outputs the maximum output torque Temax, the electric motor outputs the rest torque, and the rest torque is equal to Tc-Temax. That is, when the hybrid electrical vehicle is in the HEV cruising mode, if it is determined that the sum of the maximum output power of the electric motor and the maximum output power of the engine is larger than or equal to the second power value, when the sum of the maximum output torque of the electric motor and the maximum output torque of the engine is larger than or equal to the second torque value and the maximum output torque of the engine is less than or equal to the second torque value, the engine outputs the maximum output torque thereof and the electric motor outputs the second output torque, so that the sum of the maximum output torque of the engine and the second output torque of the electric motor is equal to the second torque value.

At step S309, when it is determined that Tc>Temax+Tmmax, step S310 is executed.

At step S310, the hybrid electrical vehicle is controlled to quit the HEV cruising mode, when the sum of the maximum output power of the electric motor and the maximum output power of the engine cannot meet the second demanded power of the hybrid electrical vehicle cruising at the current speed or the sum of the maximum output torque of the electric motor and the maximum output torque of the engine cannot meet the second demanded torque of the hybrid electrical vehicle cruising at the current speed.

In other words, if it is determined that the sum of the maximum output power of the electric motor and the maximum output power of the engine is less than the second power value or that the sum of the maximum output torque of the electric motor and the maximum output torque of the engine is less than the second torque value, the hybrid electrical vehicle is controlled to quit the HEV cruising mode.

In other words, during the cruising control in the HEV cruising mode, it is necessary to compare the output power and the output torque of the engine and the output power and the output torque of the electric motor with the demanded power and the demanded torque of the hybrid electrical vehicle cruising, the cruising output in the HEV cruising mode includes the engine output as a main output and the electric motor output as a supplementary output. If the sum of the maximum output torque of the engine and the maximum output torque of the electric motor or the sum of the maximum output power of the engine and the maximum output power of the electric motor cannot meet the demanded torque or the output power of the hybrid electrical vehicle cruising at the current speed, the hybrid electrical vehicle cannot maintain the current cruising speed to drive, and thus the hybrid electrical vehicle quits the cruising mode.

Figure 6:
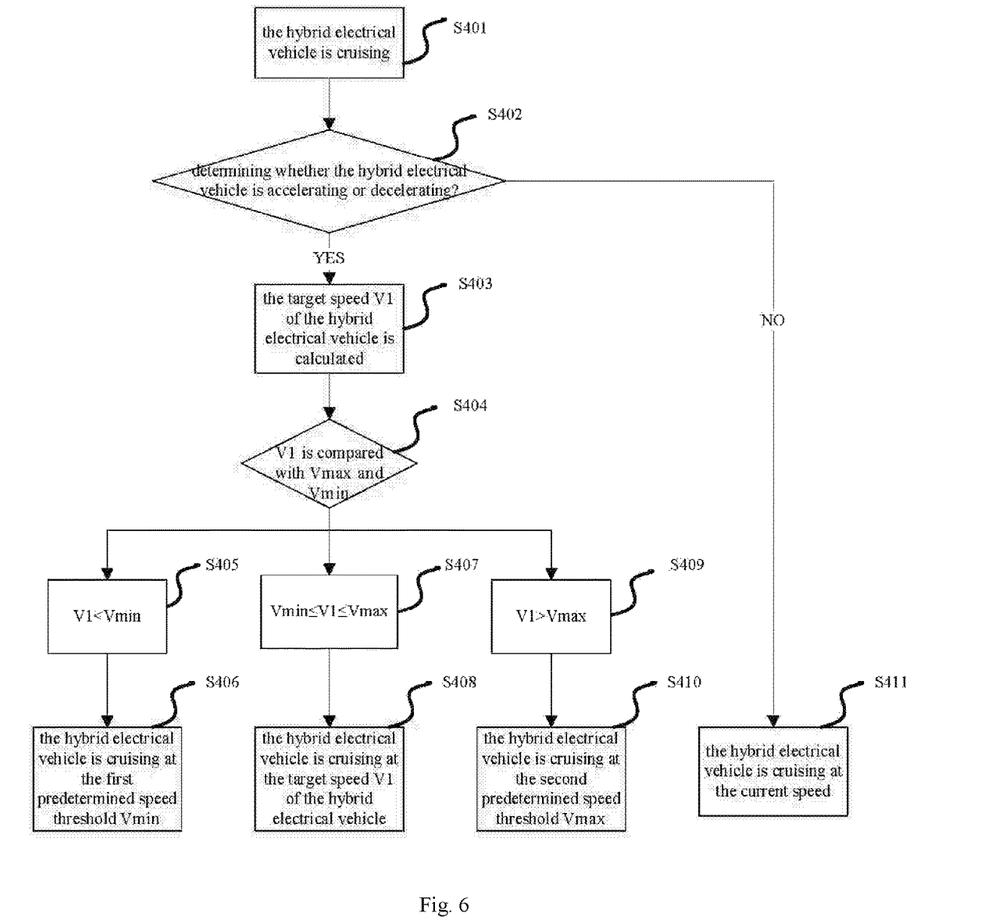
FIG. 6 is a flow chart of a method for cruising control of a hybrid electrical vehicle when the hybrid electrical vehicle is accelerating or decelerating according to an embodiment of the present disclosure.

In an embodiment of the present disclosure, as shown in FIG. 6, a method for cruising control of the hybrid electrical vehicle when the hybrid electrical vehicle is accelerating or decelerating includes following steps.

At step S401, the hybrid electrical vehicle is cruising.

At step S402, it is determined whether the hybrid electrical vehicle is accelerating or decelerating, if yes, step S403 is executed; and if no, step S411 is executed.

At step S403, when the hybrid electrical vehicle is accelerating or decelerating, the target speed V1 of the hybrid electrical vehicle is calculated.

At step S404, the target speed V1 of the hybrid electrical vehicle is compared with the upper limit (i.e. the second predetermined speed threshold Vmax) and the lower limit (i.e. the first predetermined speed threshold Vmin) of the cruise-speed to determine the relationship of the target speed V1 of the hybrid electrical vehicle and the upper limit and the lower limit of the cruise-speed.

At step S405, if it is determined that V1<Vmin, step S406 is executed.

At step S406, the hybrid electrical vehicle is cruising at the first predetermined speed threshold Vmin.

At step S407, if it is determined that Vmin≤V1≤Vmax, step S408 is executed.

At step S408, the hybrid electrical vehicle is cruising at the target speed V1 of the hybrid electrical vehicle.

At step S409, if it is determined that V1>Vmax, step S410 is executed.

At step S410, the hybrid electrical vehicle is cruising at the second predetermined speed threshold Vmax.

At step S411, if the hybrid electrical vehicle is not accelerating or decelerating, the hybrid electrical vehicle is cruising at the current speed.

In other words, when an acceleration and deceleration setting signal of a cruise speed is detected, the control module calculates the target speed of the hybrid electrical vehicle and then compares the target speed of the hybrid electrical vehicle with a lower limit of the cruise-speed (i.e. the first predetermined speed threshold Vmin) and an upper limit of the cruise-speed (i.e. the second predetermined speed threshold Vmax). If the target speed of the hybrid electrical vehicle is larger than or equal to the lower limit of the cruise-speed and less than or equal to the upper limit of the cruise-speed, the hybrid electrical vehicle is controlled to cruise at the target speed of the hybrid electrical vehicle. If the target speed of the hybrid electrical vehicle is less than the first predetermined speed threshold Vmin, the hybrid electrical vehicle is controlled to cruise at the first predetermined speed threshold Vmin. If the target speed of the hybrid electrical vehicle is larger than the second predetermined speed threshold Vmax, the hybrid electrical vehicle is controlled to cruise at the second predetermined speed threshold Vmax. During the cruising process, if the acceleration and deceleration setting signal of the cruise speed is not detected, the hybrid electrical vehicle is cruising at the current speed. Thus, it is possible to ensure the hybrid electrical vehicle to cruise at any speed in the predetermined cruise-speed range, at the same time to avoid quitting the cruising mode caused by the fact that the driving speed exceeds the predetermined cruise-speed range so as to ensure the continuous reliability of the cruising.

With the method for cruising control of the hybrid electrical vehicle according to embodiments of the present disclosure, the hybrid electrical vehicle is cruising in two working modes, i.e. the HEV mode and the EV mode, which provides the cruising control strategies of two working modes. Moreover, if the cruising demand cannot be met in the EV mode, the engine automatically starts, the hybrid electrical vehicle enters the cruising control strategy in the HEV mode, and the cruising control and the accelerating and decelerating control of the cruising speed are also provided, which can ensure the hybrid electrical vehicle to cruise at any speed in the predetermined cruise-speed range.

With the method for cruising control of the hybrid electrical vehicle according to embodiments of the present disclosure, the user can control the hybrid electrical vehicle to cruise in the HEV mode and the EV mode, which can meet the EV cruising demand of the user and reduce fuel consumption. Moreover, it is possible to ensure that if the cruising demand cannot be met in the EV mode, the cruising control strategy in the HEV mode is switched so as to ensure the continuous reliability of the cruising for the user. The cruising control strategies of two working modes can meet different driving demands of the user, which can realize a selection of driving modes and obtain a constant driving speed by means of an automatic cruising function, so as to meet different driving requirements of the driver, to facilitate the driving and to reduce fuel consumption at the same time, which is more economic and facilitates environmental protection. In addition, the accelerating and decelerating control of the cruising speed is also provided, which can ensure the hybrid electrical vehicle to cruise at any speed in the predetermined cruise-speed range, and when the target speed exceeds the predetermined cruise-speed range, the hybrid electrical vehicle is cruise at the upper limit and the lower limit of the cruise-speed, which ensures the continuous reliability of the cruising.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for cruising control of a hybrid electrical vehicle, comprising:
   detecting a current speed of the hybrid electrical vehicle;
   determining that the current speed of the hybrid electrical vehicle is in a predetermined cruise-speed range;
   detecting a cruising signal and a current working mode of the hybrid electrical vehicle, wherein the current working mode of the hybrid electrical vehicle is an electric vehicle (EV) mode;
   controlling the hybrid electrical vehicle to enter an EV cruising mode;
   detecting that (1) a maximum output power of an electric motor of the hybrid electrical vehicle is less than a first power value or (2) a maximum output torque of the electric motor of the hybrid electrical vehicle is less than a first torque value, wherein the first power value is a first demanded power of the hybrid electrical vehicle in the EV cruising mode cruising at the current speed, and wherein the first torque value is a first demanded torque of the hybrid electrical vehicle cruising at the current speed when the hybrid electrical vehicle is in the EV cruising mode; and
   subsequent to detecting that the maximum output power of the electric motor is less than the first power value or the maximum output torque of the electric motor is less than the first torque value, switching the hybrid electrical vehicle from the EV cruising mode to a hybrid electrical vehicle (HEV) cruising mode.

2. The method of claim 1, wherein determining that the current speed of the hybrid electrical vehicle is in the predetermined cruise-speed range comprises:
   detecting that the current speed of the hybrid electrical vehicle is larger than or equal to a first predetermined speed threshold and less than or equal to a second predetermined speed threshold, wherein the first predetermined speed threshold is less than the second predetermined speed threshold.

3. The method of claim 2, further comprising:
   determining that the hybrid electrical vehicle is accelerating or decelerating when the hybrid electrical vehicle is cruising;
   obtaining a target speed of the hybrid electrical vehicle;
   generating a comparison result by comparing the target speed of the hybrid electrical vehicle with the first predetermined speed threshold and the second predetermined speed threshold;
   controlling a cruising speed of the hybrid electrical vehicle according to the comparison result.

4. The method of claim 3, wherein controlling the cruising speed of the hybrid electrical vehicle according to the comparison result comprises:

detecting that the target speed of the hybrid electrical vehicle is less than the first predetermined speed threshold; and
controlling the cruising speed of the hybrid electrical vehicle to be the first predetermined speed threshold.

5. The method of claim 3, wherein controlling the cruising speed of the hybrid electrical vehicle according to the comparison result comprises:
detecting that the target speed of the hybrid electrical vehicle is larger than or equal to the first predetermined speed threshold and less than or equal to the second predetermined speed threshold; and
controlling the cruising speed of the hybrid electrical vehicle to be the target speed of the hybrid electrical vehicle.

6. The method of claim 3, wherein controlling the cruising speed of the hybrid electrical vehicle according to the comparison result comprises:
detecting that the target speed of the hybrid electrical vehicle is larger than the second predetermined speed threshold; and
controlling the cruising speed of the hybrid electrical vehicle to be the second predetermined speed threshold.

7. The method of claim 1, further comprising:
determining that the maximum output power of the electric motor is larger than or equal to the first power value and the maximum output torque of the electric motor is larger than or equal to the first torque value of the hybrid electrical vehicle in the EV cruising mode; and
controlling the electric motor to output a first output torque according to the first demanded torque of the hybrid electrical vehicle cruising at the current speed.

8. The method of claim 1, further comprising:
determining that a sum of the maximum output power of the electric motor and a maximum output power of an engine is larger than or equal to a second power value of the hybrid electrical vehicle in the HEV cruising mode;
determining that (i) a sum of the maximum output torque of the electric motor and a maximum output torque of the engine is larger than or equal to a second torque value and the maximum output torque of the engine is less than or equal to the second torque value, or (ii) the maximum output torque of the engine is larger than the second torque value; and
controlling the engine to output the maximum output torque and the electric motor to output a second output torque, so that a sum of the maximum output torque of the engine and the second output torque of the electric motor is equal to the second torque value,
wherein the second power value is a second demanded power of the hybrid electrical vehicle cruising at the current speed of the hybrid electrical vehicle in the HEV cruising mode; and wherein the second torque value is a second demanded torque of the hybrid electrical vehicle cruising at the current speed of the hybrid electrical vehicle in the HEV cruising mode.

9. The method of claim 8, further comprising:
detecting that (i) the sum of the maximum output power of the electric motor and the maximum output power of the engine is less than the second power value or (ii) the sum of the maximum output torque of the electric motor and the maximum output torque of the engine is less than the second torque value; and
controlling the hybrid electrical vehicle to quit the HEV cruising mode.

10. The method of claim 8, further comprising:
determining that the maximum output torque of the engine is larger than the second torque value; and
controlling the engine to output a third output torque according to the second demanded torque of the hybrid electrical vehicle cruising at the current speed.

11. A hybrid electrical vehicle, comprising:
a transmission device configured to drive wheels of the hybrid electrical vehicle;
an engine and a gearbox, wherein the engine is connected with the transmission device via the gearbox;
an electric motor and a gear reducer, wherein the electric motor is connected with the transmission device via the gear reducer;
a power battery configured to supply power to the electric motor;
a speed detector configured to detect a current speed of the hybrid electrical vehicle; and
a control module connected with the speed detector, the engine, the gearbox, and the electric motor, respectively, wherein the control module is configured to determine whether the current speed of the hybrid electrical vehicle is in a predetermined cruise-speed range and to control the hybrid electrical vehicle to enter a corresponding cruising mode according to a cruising signal and a current working mode of the hybrid electrical vehicle based on determining that the current speed of the hybrid electrical vehicle is in the predetermined cruise-speed range;
wherein the control module is further configured to control the hybrid electrical vehicle to enter a hybrid electrical vehicle (REV) cruising mode based on determining that the current working mode of the hybrid electrical vehicle is a HEV mode;
wherein the control module is further configured to control the hybrid electrical vehicle to enter an EV cruising mode based on determining that the current working mode of the hybrid electrical vehicle is an EV mode; and
wherein the control module is further configured to control the hybrid electrical vehicle to enter the HEV cruising mode and controls the engine of the hybrid electrical vehicle to start based on determining that the hybrid electrical vehicle is in the EV cruising mode and a maximum output power of the electric motor of the hybrid electrical vehicle is less than a first power value or a maximum output torque of the electric motor of the hybrid electrical vehicle is less than a first torque value, wherein the first power value is a first demanded power of the hybrid electrical vehicle cruising at the current speed of the hybrid electrical vehicle in the EV cruising mode and wherein the first torque value is a first demanded torque of the hybrid electrical vehicle cruising at the current speed of the hybrid electrical vehicle in the EV cruising mode.

12. The hybrid electrical vehicle of claim 11, wherein the control module is configured to determine that the current speed of the hybrid electrical vehicle is in the predetermined cruise-speed range, and determine whether the current speed of the hybrid electrical vehicle is larger than or equal to a first predetermined speed threshold and less than or equal to a second predetermined speed threshold, wherein the first predetermined speed threshold is less than the second predetermined speed threshold.

13. The hybrid electrical vehicle of claim 11, wherein the control module is configured to:

determine whether the maximum output power of the electric motor is larger than or equal to the first power value and the maximum output torque of the electric motor is larger than or equal to the first torque value of the hybrid electrical vehicle in the EV cruising mode; and control the electric motor to output a first output torque according to the first demanded torque of the hybrid electrical vehicle cruising at the current speed based on determining that the maximum output power of the electric motor is larger than or equal to the first power value and the maximum output torque of the electric motor is larger than or equal to the first torque value.

14. The hybrid electrical vehicle of claim 11, wherein the control module is configured to:

determine whether a sum of the maximum output power of the electric motor and a maximum output power of the engine is larger than or equal to a second power value of the hybrid electrical vehicle in the HEV cruising mode; and determine whether a sum of the maximum output torque of the electric motor and a maximum output torque of the engine is larger than or equal to a second torque value and the maximum output torque of the engine is less than or equal to the second torque value, or whether the maximum output torque of the engine is larger than the second torque value based on determining that the sum of the maximum output power of the electric motor and the maximum output power of the engine is larger than or equal to the second power value; and control the engine to output the maximum output torque and the electric motor to output a second output torque, so that a sum of the maximum output torque of the engine and the second output torque of the electric motor is equal to the second torque value, based on determining that the sum of the maximum output torque of the electric motor and the maximum output torque of the engine is larger than or equal to the second torque value and the maximum output torque of the engine is less than or equal to the second torque value, or control the engine to output a third output torque according to a second demanded torque of the hybrid electrical vehicle cruising at the current speed based on determining that the maximum output torque of the engine is larger than the second torque value, wherein the second power value is a second demanded power of the hybrid electrical vehicle in the HEV cruising mode cruising at the current speed, and the second torque value is the second demanded torque of the hybrid electrical vehicle in the HEV cruising mode cruising at the current speed.

15. The hybrid electrical vehicle of claim 14, wherein:

the control module is configured to control the hybrid electrical vehicle to quit the HEV cruising mode based on determining that the sum of the maximum output power of the electric motor and the maximum output power of the engine is less than the second power value or the sum of the maximum output torque of the electric motor and the maximum output torque of the engine is less than the second torque value.

16. The hybrid electrical vehicle of claim 12, wherein the control module is further configured to:

determine whether the hybrid electrical vehicle is accelerating or decelerating when the hybrid electrical vehicle is cruising;

obtain a target speed of the hybrid electrical vehicle based on determining that the hybrid electrical vehicle is accelerating or decelerating;

compare the target speed of the hybrid electrical vehicle with the first predetermined speed threshold and the second predetermined speed threshold; and control a cruising speed of the hybrid electrical vehicle according to a comparison result.

17. The hybrid electrical vehicle of claim 16, wherein the control module is further configured to control the cruising speed of the hybrid electrical vehicle according to the comparison result by:

controlling the cruising speed of the hybrid electrical vehicle to be the first predetermined speed threshold based on determining that the target speed of the hybrid electrical vehicle is less than the first predetermined speed threshold;

controlling the cruising speed of the hybrid electrical vehicle to be the target speed of the hybrid electrical vehicle based on determining that the target speed of the hybrid electrical vehicle is larger than or equal to the first predetermined speed threshold and less than or equal to the second predetermined speed threshold; and controlling the cruising speed of the hybrid electrical vehicle to be the second predetermined speed threshold based on determining that the target speed of the hybrid electrical vehicle is larger than the second predetermined speed threshold.

* * * * *

UNITED STATES PATENT AND TRADEMARK OFFICE
CERTIFICATE OF CORRECTION

| | |
|---|---|
| PATENT NO. | : 10,099,690 B2 |
| APPLICATION NO. | : 14/917866 |
| DATED | : October 16, 2018 |
| INVENTOR(S) | : Wang et al. |

It is certified that error appears in the above-identified patent and that said Letters Patent is hereby corrected as shown below:

In the Claims

Column 16,
Line 32, "(REV)" should read --(HEV)--.

Signed and Sealed this
Fourth Day of December, 2018

Andrei Iancu
*Director of the United States Patent and Trademark Office*